United States Patent
Zapp

(10) Patent No.: US 6,340,093 B1
(45) Date of Patent: Jan. 22, 2002

(54) FUEL TANK

(75) Inventor: Thomas Zapp, Eschborn (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/299,867

(22) Filed: Apr. 27, 1999

(30) Foreign Application Priority Data

May 4, 1998 (DE) .......................................... 198 19 779

(51) Int. Cl.[7] .............................................. B65D 47/00
(52) U.S. Cl. ..................... 220/86.1; 220/86.2; 220/86.3
(58) Field of Search ............................. 220/86.1, 86.2, 220/86.3; 285/192, 361, 376, 396, 402, 331

(56) References Cited

U.S. PATENT DOCUMENTS

| | | | | |
|---|---|---|---|---|
| 1,461,436 A | * | 7/1923 | Arrigoni | 220/86.2 |
| 1,499,629 A | * | 7/1924 | Arnold | 220/86.2 X |
| 1,512,065 A | * | 10/1924 | Taylor | 220/86.3 |
| 2,524,313 A | * | 10/1950 | Gerling | 220/86.3 X |
| 2,576,192 A | * | 11/1951 | Poznik | 220/86.2 |
| 3,016,161 A | * | 1/1962 | Peplin | 220/86.3 X |
| 3,334,779 A | * | 8/1967 | Smith | 220/86.2 |
| 3,865,270 A | * | 2/1975 | Petersson | 220/721 |
| 4,234,098 A | * | 11/1980 | Miller et al. | 220/86.2 |
| 4,235,263 A | * | 11/1980 | Lake, Jr. | 220/86.2 X |
| 4,462,620 A | * | 7/1984 | Bambeck et al. | 220/86.2 X |
| 4,482,075 A | * | 11/1984 | Stotz et al. | 220/86.2 |
| 4,718,568 A | * | 1/1988 | Dal Palu | 220/86.2 |
| 5,033,521 A | * | 7/1991 | Martin | 220/86.2 X |
| 5,190,180 A | * | 3/1993 | Crone | 220/86.2 |
| 5,310,226 A | * | 5/1994 | Norkey | 285/316 |
| 5,427,263 A | * | 6/1995 | Bowler | 220/86.2 |
| 5,568,828 A | * | 10/1996 | Harris | 220/86.2 X |
| 5,794,805 A | * | 8/1998 | Branham | 220/86.2 |
| 6,053,537 A | * | 4/2000 | Guest | 285/148.19 |

FOREIGN PATENT DOCUMENTS

| | | | | |
|---|---|---|---|---|
| AU | 154693 | * | 7/1953 | 220/86.2 |
| EP | 19511073 | | 3/1995 | |
| EP | 29719910 | | 11/1997 | |
| WO | 91/11342 | * | 8/1991 | 220/86.2 |

* cited by examiner

Primary Examiner—Stephen P. Garbe
Assistant Examiner—Joseph C. Merek
(74) Attorney, Agent, or Firm—Richard A. Speer; Mayer, Brown & Platt

(57) ABSTRACT

A fuel tank (1) possesses, for the introduction of fuel, a filler pipe (5) which is led through an orifice (6) of the fuel tank (1) with all-round clearance. The orifice (6) is sealingly closed by means of a sleeve (4) bearing against the fuel tank (1) and against the filler pipe (5). The orifice (6) can thereby be made relatively large, so that it can be additionally used also as a service or assembly orifice after the sleeve (4) has been removed. The number of orifices necessary on the fuel tank (1) can be reduced as a result, so that both the maximum filling quantity and the permeation tightness can be increased.

8 Claims, 2 Drawing Sheets

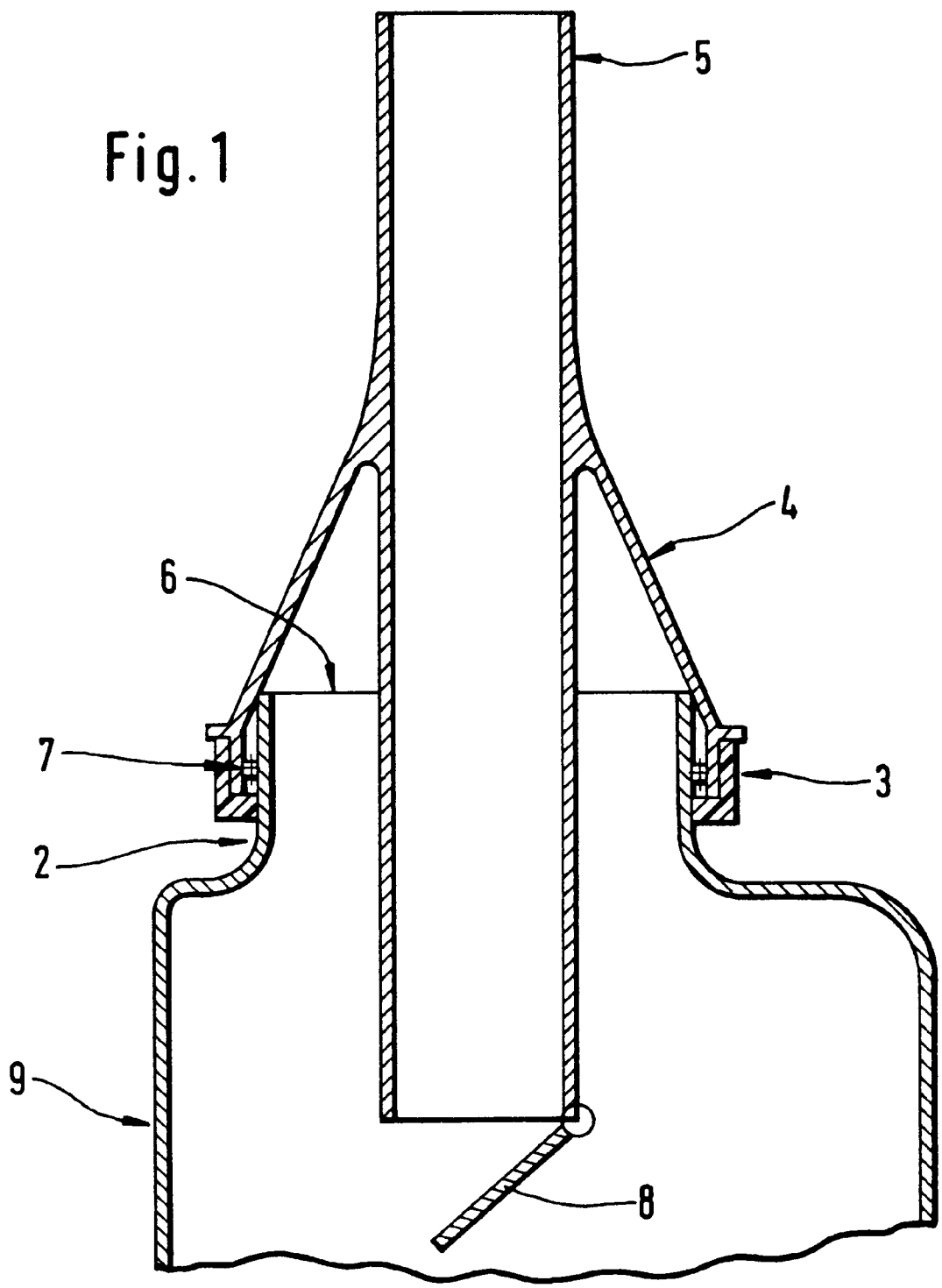

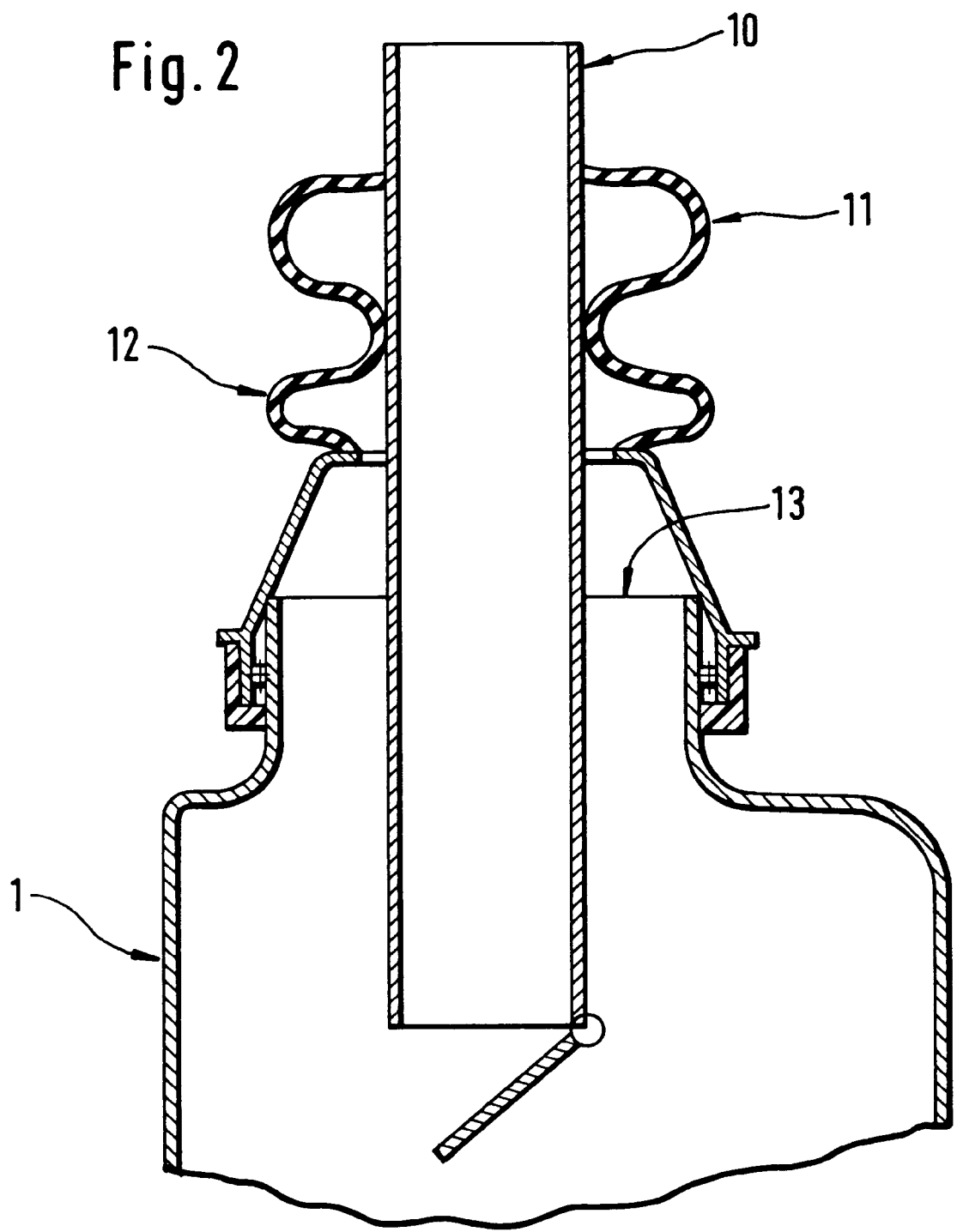

FUEL TANK

BACKGROUND OF THE INVENTION

The invention relates to a fuel tank with an orifice for the introduction of fuel and with a filler pipe.

In present-day automobiles, such fuel tanks are usually located on the underside of the floor panel in the rear part of the automobiles. The fuel tanks possess, in addition to the filler pipe for filling the fuel tank, at least one connection for a fuel line leading to the drive of the automobile. In order to supply the drive with fuel, it is necessary to have a series of fittings in the interior of the fuel tank, particularly so as to ensure that fuel is supplied in all possible driving situations. For example, guide plates are necessary for this purpose, but also sucking jet pumps which convey the fuel out of various lower regions into a dashpot, from where the fuel passes into the fuel line. The fuel pumps required for this purpose are increasingly arranged inside the fuel tank. This is advantageous primarily because of the more stringent statutory requirements as regards permeation tightness. Attempts are therefore made to place as large a proportion as possible of the necessary connection and line elements inside the fuel tank, so that they are additionally protected from the surroundings by the fuel tank wall. The multiplicity of fittings to be mounted inside the fuel tank necessarily presents the problem that access to the interior of the fuel tank is relatively difficult. Service or maintenance orifices therefore have to be provided, at least for the comparatively large components, such as, for example, the fuel pump. These orifices entail the disadvantage of impaired permeation tightness. A considerable fraction of the improved permeation tightness which can be achieved by means of the fittings arranged in the interior is lost again through such orifices. Proposals are already known for arranging the fittings inside the fuel tank as early as during the production process, so that, at the time of subsequent assembly, it is no longer necessary to have any assembly orifices. A disadvantage of this is that a corresponding maintenance orifice is necessary for repairs occurring later, since the fuel tank would otherwise have to be exchanged completely.

Moreover, in the fuel tanks known from the prior art, shaping the fuel tank wall specially in order to meet the need for an orifice has the effect of reducing the maximum possible filling volume. On the assumption that a maximum filling volume is to be achieved for a predetermined available installation space, any orifice in the fuel tank signifies an undesirable restriction.

Furthermore, the orifice provided for installing the fuel pump is often arranged in the region of the back seat and is therefore accessible only from the interior. Maintenance or repair work inside the fuel tank therefore not only causes annoyance due to unpleasant smells, but also entails a health hazard, for example on account of released benzenes and other substances.

The problem on which the invention is based is to design a fuel tank of the type mentioned, in such a way that, apart from the orifices which are absolutely necessary, in particular the filler orifice, it does not require any other assembly or maintenance orifices. At the same time, in particular, volume-reducing special shaping of the fuel tank wall and orifices accessible only from the interior of the automobile are to be dispensed with.

BRIEF SUMMARY OF THE INVENTION

This problem is solved, according to the invention, in that the filler pipe is introduced into the fuel tank with a clearance relative to the orifice, and in that the filler pipe is releasably and sealingly connected to the fuel tank by means of a sleeve. As a result, the orifice can serve for the introduction of fuel and, at the same time, perform the function of a service or maintenance orifice. For this purpose, the orifice has a correspondingly large diameter, and, in the operating state, said orifice is sealingly closed by means of the sleeve. If access to the inside of the fuel tank becomes necessary, the sleeve, together with the filler pipe, can be released from the fuel tank, so that access to the interior is possible without any difficulty. Consequently, according to the invention, the number of orifices necessary in the fuel tank can be reduced. Furthermore, access from outside, preferably through the wheel case, is possible as a result of preferred arrangement of the filler pipe in a rear lateral region of the automobile. It is thereby possible to avoid annoying smells in the automobile interior.

The sleeve can be placed, essentially flat, onto the surface of the fuel tank and connected to the latter. Connection of the sleeve to the fuel tank is particularly simple in an embodiment of the invention in which the fuel tank has a filler neck and the sleeve is placed onto the filler neck. The sleeve can thereby be easily connected to the filler neck and, at the same time, can easily be sealed off. Since the sleeve overlaps the filler neck, in this case a connection is obtained which is easy to operate and at the same time has a high mechanical load-bearing capacity.

A development of the invention is particularly favorable, here, in which the sleeve is designed approximately conically and with its wide orifice surrounds the filler neck. As a result, the sleeve can compensate dimensional deviations which occur when the fuel tank and the filler pipe are being installed in the automobile. In this case, the sleeve may also sealingly surround the filler neck even when the latter is inadvertently arranged at an oblique angle to the filler pipe. The mechanical stability of the sleeve can be further improved at the same time.

An embodiment of the invention is particularly advantageous here, in which the sleeve is connected in one piece to the filler pipe. The seal otherwise necessary between the sleeve and the filler pipe may thereby be dispensed with. Permeation tightness can be further increased as a result, and at the same time the number of components reduced, thus leading not only to a decrease in weight, but also to a lowering of the production costs.

In order to remove the sleeve, the filler pipe, usually connected to a body element, must first be released at both ends from its mountings. The filler pipe can then be taken out of the orifice. In a development of the invention which is particularly simple, as compared with this, the sleeve has a flexible portion. To remove the filler pipe, therefore, it is not necessary to release its other fastenings first. Instead, the flexible sleeve, provided, for example, with a concertina, needs to be released only at its end facing the fuel tank. At the same time, the sleeve designed in this way is considerably easier to mount, since inaccuracies in the fit are compensated by the flexible portion.

Another particularly advantageous development of the invention is afforded by connecting the sleeve to the fuel tank by means of quick-acting coupling. The connection between the sleeve and the fuel tank can therefore be released easily, even without a special tool, with the result that the amount of time required for corresponding maintenance work can also be reduced.

A development, in which the coupling has a bayonet fastening, is particularly favorable here. Operation is thereby easily possible even without a tool, assembly errors being largely ruled out.

Another particularly advantageous development of the invention is afforded when the filler pipe has a nonreturn valve. In consequence, the fuel located in the fuel tank cannot flow back into the filler pipe even under extreme driving conditions. Moreover, the nonreturn valve prevents a sudden overflow of the fuel tank during filling.

BRIEF DESCRIPTION OF THE DRAWINGS

The invention permits various embodiments. To make its basic principle even clearer, one of these is illustrated in the drawing and is described below. In the drawing:

FIG. 1 shows a sectional illustration of a fuel tank according to the invention, FIG. 2 shows a sectional illustration of another embodiment of the fuel tank.

DETAILED DESCRIPTION OF THE INVENTION

FIG. 1 shows a lateral sectional illustration of a fuel tank 1, only a portion of which is illustrated, with a filler neck 2 appended on top. The filler neck 2 carriers, on the outside, a rim 3, into which a sleeve 4 is sealingly inserted. The sleeve 4 is designed conically and its upper end is connected in one piece to a filler pipe 5. The filler pipe 5 projects through an orifice 6 of the fuel tank 1 into the interior of the latter and, at the same time, has an all-round clearance relative to the orifice 6. The orifice 6 is made relatively large, as compared with the outside diameter of the filler pipe 5, and can therefore at the same time also be used as an assembly or service orifice. For this purpose, the sleeve 4 is equipped with a coupling 7 which is designed as a bayonet fastening and which is illustrated merely by way of example. In order to protect the fuel tank 1 against the fuel possibly flowing back into the filler pipe 5 under adverse driving conditions, the filler pipe 5 is equipped with a nonreturn valve 8 designed as a nonreturn flap.

FIG. 2 likewise shows a lateral sectional illustration of a fuel tank 9 which is modified only slightly in relation to the embodiment illustrated in FIG. 1. In this case, a filler pipe 10 is connected to the fuel tank 9 by means of a flexible portion 11 of a sleeve 12, said flexible portion being designed as a concertina, with the result that mounting and demounting are substantially simplified.

I claim:

1. An automobile fuel tank assembly comprising:

(a) a fuel tank having an outwardly extending filler neck dimensioned to define a tank orifice providing manual access into the interior of the tank;

(b) a filler pipe including (i) a fuel flow directing pipe that extends through the tank orifice from the outside of the tank to the inside thereof, wherein the cross-sectional area of the pipe is less than the cross-sectional area of the filler neck and an annular space separates the filler neck from the fuel flow directing pipe; (ii) a sleeve located intermediate the ends of the flow directing pipe and extending between the filler neck and the flow directing pipe to seal the annular space therebetween; and (iii) means for releasably connecting the sleeve to the filler neck so that the filler pipe can be removed from the tank orifice when manual access into the tank is desired.

2. The fuel tank as claimed in claim 1, wherein said fuel tank has a filler neck and the sleeve is pushed over the filler neck.

3. The fuel tank as claimed in claim 1, wherein the sleeve is designed conically to have relatively narrower and wider orifices and the wide orifice, surrounds the filler neck.

4. The fuel tank as claimed in any one of the preceding claims, wherein the sleeve is connected in one piece to the filler pipe.

5. The fuel tank as claimed in claim 1, wherein the sleeve has a flexible portion.

6. The fuel tank as claimed in claim 1, wherein the sleeve is connected to the fuel tank by means of a quick-acting coupling.

7. The fuel tank as claimed in claim 6, wherein the coupling is a bayonet fastening.

8. The fuel tank as claimed in claim 1, wherein the filler pipe has a nonreturn valve.

\* \* \* \* \*